United States Patent [19]

Gräf

[11] Patent Number: 5,695,646
[45] Date of Patent: Dec. 9, 1997

[54] PROCESS FOR CONDITIONING SOFT WATER TO BECOME DRINKING WATER

[75] Inventor: Franz Gräf, Hadamar, Germany

[73] Assignee: Passavant-Werke AG, Germany

[21] Appl. No.: 568,603

[22] Filed: Dec. 5, 1995

[51] Int. Cl.[6] .................................................. C02F 1/56
[52] U.S. Cl. .................. 210/716; 210/709; 210/724; 210/727; 210/743
[58] Field of Search ..................... 210/702, 709, 210/721, 724, 725, 726, 727, 728, 716, 743

[56] References Cited

U.S. PATENT DOCUMENTS

| | | | |
|---|---|---|---|
| 3,080,315 | 3/1963 | Silvey | 210/754 |
| 4,188,291 | 2/1980 | Anderson | 210/724 |
| 4,388,195 | 6/1983 | von Hagel et al. | 210/725 |
| 4,839,057 | 6/1989 | White | 210/724 |

FOREIGN PATENT DOCUMENTS

| | | |
|---|---|---|
| 0 380 299 | 8/1990 | European Pat. Off. . |
| 0 536 908 | 4/1993 | European Pat. Off. . |

*Primary Examiner*—Peter A. Hruskoci
*Attorney, Agent, or Firm*—Larson and Taylor

[57] ABSTRACT

In connection with processes for conditioning soft water (pH less than/equal to 6) to become drinking water, it is necessary to supply hardening agents in order to raise the carbonate-dissolving pH value into the neutral range. Subsequently the turbid materials are flocculated out and the flocculation products are filtered off. Finally, the calcite equilibrium must be set by means of a renewed addition of a hardening agent. This process is simplified by means of the invention in that the calcite equilibrium by means of the supply of highly pure lime water is only set after filtering off the flocculation products. In the flocculation stage, highly pure lime water is also preferably employed for setting the flocculation pH value.

3 Claims, 1 Drawing Sheet

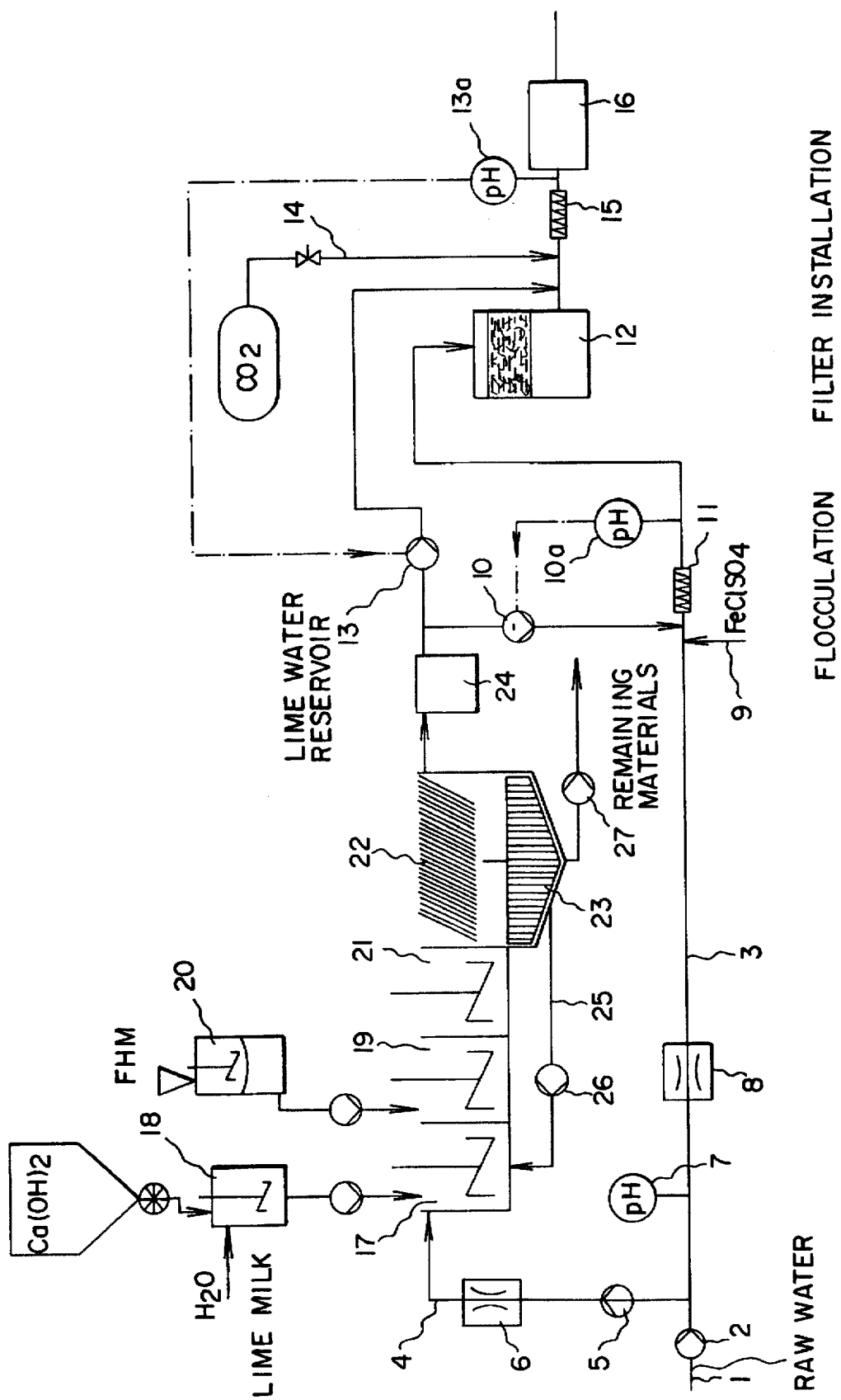

PROCESS FOR CONDITIONING SOFT WATER TO BECOME DRINKING WATER

FIELD OF THE INVENTION

The invention relates to a process for conditioning soft water having a pH value of less than/equal to 6 to become drinking water by raising the pH value and by adjusting the calcite equilibrium.

BACKGROUND OF THE INVENTION

One of the most important judgement criteria in connection with the use of drinking water is the ability of the water to discharge or dissolve calcium carbonate. The Drinking Water Ordinance of Dec. 16, 1990 prescribes, among other things, that with metallic and concrete-containing materials the pH value of the drinking water to be delivered is not permitted to fall below the pH value of the calcium carbonate saturation, wherein fluctuations up to −0.2 pH units are permitted.

Water from dams often is very soft and has a low pH value because of the lack of pH-buffering salts, and therefore acts to dissolve carbonate and causes corrosion in metallic materials. Hardening of the water by supplying hardening agents, such as lime water and carbon dioxide, is required in order to set the lime-carbon dioxide-equilibrium from the point of view of chemical corrosion. In a simplified manner, the chemical reaction runs as follows:

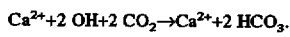

$Ca^{2+} + 2\ OH + 2\ CO_2 \rightarrow Ca^{2+} + 2\ HCO_3$.

Calcium hydrate, which can be metered in as a milk-of-lime suspension, and semi-calcined dolomite, jurassic limestone or limestone, which are employed as bulk materials in flow-through solution containers, are found among the hardening minerals.

An already known process for conditioning too soft water is characterized in that the pH value of the raw water is first raised by the supply of at least one hardening agent, that subsequently the turbid materials are flocculated and the flocculation products are filtered off and finally the calcite equilibrium is set by a renewed supply of a hardening agent (Z. "gwf"—Das Gas-Wasser-Fach [Gas-Water Field], 4/93, pp. 3 to 6).

It is disadvantageous in connection with this known and actually used process that the pH value must be twice raised, namely first to set a basic hardness and then, after filtering, for re-hardening, i.e. setting a calcite equilibrium.

SUMMARY OF THE INVENTION

The object of avoiding this disadvantage is attained in accordance with the invention which provides a method of increasing carbonate hardness of raw soft water having a pH value of not greater than 6 for use as drinking water. According to the method, metallic salts are added to create sedimentation and flocculation of suspended salts in the raw water. The reaction products formed during flocculation are then filtered and carbon dioxide and high purity lime water are added to the resultant filtered water to increase carbonate hardness.

BRIEF DESCRIPTION OF THE DRAWING

The FIGURE shows a process flow diagram in accordance with a preferred embodiment of the invention.

DETAILED DESCRIPTION OF THE PREFERRED EMBODIMENTS

The advantage that hardening is now performed only after filtration is connected with the changed process, since the highly reactive lime water is supplied as a clear solution without it being necessary to perform the separation of solids which is otherwise required. This provides the possibility to condition acid, soft water in such a way that flocculation can be performed in the first conditioning step in the optimal pH range. Flocculation as a pre-treatment is always required when the turbidity value of ≦1.0 TE/F in the drinking water cannot be achieved by simple filtration. In most cases, iron-III salts, such as $FeClSO_4$ or $FeCl_3$, or aluminum salts, such as $AlCl_3$, $Al_2(SO_4)_3$ or polyaluminum chloride, are employed as flocculation agents, whose effect as destabilizing agent for the colloids and their hydrolizing action to form non-soluble, flake-forming $Fe(OH)_3$ is known. In this connection, a pH range between 6.0 to 6.5 is often desired in order to more effectively reduce the dissolved organics, the remaining iron or aluminum values. The specific amount of flocculation agent to be metered in lies around 0.1 to 0.2 mol/$m^3$, depending on the quality of the raw water. The stoichiometric acid equivalents being released in the process permit the pH value to fall far below pH 6.0, so that lime water as a hydroxide ion supplier has to neutralize the acid portion. The optimum set pH value is maintained by means of a pH measuring and regulating system. The calcium ions of the lime water contribute to slight pre-hardening.

The second conditioning step is the separation of the turbid materials and of the destabilized flocculated content materials of the raw water by means of sand filters or multi-layered filters. Since the optimum flocculation pH value lies in the slightly acid range, it is necessary to deacidify, harden the water following filtration and to set the lime-carbon dioxide equilibrium. In accordance with the invention, these three adjustments are performed in one step, wherein the calcite equilibrium setting leads to pH values of 8.0<pH<8.5 and in this way an essential prerequisite is met for water which is safe hygienically and corrosion-chemically. Although the degree of hardness can be arbitrarily set up to 7° dH, it should essentially be made a function of the materials used in the supply network. For example, when using iron material (unalloyed and zinc-coated) in accordance with DIN 50930, Part 1-5, the carbonate hardness must not fall below 4.2° dH.

The highly pure lime water used in accordance with the invention is prepared in a part of an installation known from German Patent DE-PS 28 02 066. The solution consists of a lime milk suspension prepared with calcium hydrate or slaked with calcinated lime, which is thinned with preparation water to a maximum lime dissolution concentration in the conditioning installation. In accordance with the invention, the raw water taken from the main line prior to the actual drinking water treatment is employed as the preparation water.

By means of lime water conditioning it is achieved that the calcium hydroxide is completely dissolved and is therefore present completely dissociated ($Ca^{2+} + 2\ OH$), wherein a concentration of approximately 1.4 kg/$m^3$ of $Ca(OH)_2$ is achieved.

Inert solids which, depending on the type, are present in various amounts and composition, are separated in the form of sedimentable content materials from the clear solution by means of the flocculation process. In the process the water-suspension mixture flows through a multi-stage chamber arrangement, in which the physical-chemical basic operations for dissolving the lime, the coagulation of micro-flakes and the formation of sedimentable macro-flakes occur. Only a synthetic poly-electrolyte is required as the flocculation agent, while the primary flocculation agent need not be metered in since, depending on the type of lime, in most cases sufficient magnesium ions are contained as an accompaniment. These and the heavy metals present precipitate in the form of hydroxides and in the process act in a destabilizing manner as the primary flocculating agent in the same way as a customarily employed trivalent metal salt.

The separation of the flocculated solids is performed via a parallel plate separator and an immediately connected thickener. The clear phase exiting at the top is almost free of solids. The total conditioning, consisting of dissolving and sedimentation time, takes approximately 15 minutes.

The drawing figure represents the process flow diagram in the preferred embodiment.

The reference numerals inserted into the schematic view of the installation have the following meaning:

1 Raw water inlet
2 Feed pump
3 Main line
4 Branch line
5 Feed pump in the branch line
6 Flow-through meter in the branch line
7 pH meter in the main line
8 Flow-through meter in the main line
9 Metering of the flocculation agent
10 Metering pump for lime water
10a pH meter downstream of the reaction vessel with control line to the metering pump 10
11 Reaction vessel with mixer
12 Filter
13 Metering pump for lime water
13a pH meter downstream of the mixing and reaction section with control line to the metering pump 13
14 $CO_2$ supply line
15 Mixing section
16 Buffer basin
17 Sludge contact and flocculating basin
18 Lime milk preparation vessel
19 Mixing basin for flocculation aid (FHM)
20 Preparation vessel for PHM (polyelectrolyte)
21 Reaction basin
22 Oblique plate sedimentation device
23 Sludge thickener
24 Storage vessel for lime water
25 Contact sludge return
26 Return pump
27 Removal of excessive sludge

I claim:

1. A method of increasing carbonate hardness of raw soft water having a pH value of not greater than 6 for use as drinking water, the method comprising the steps of:

adding metallic salts to create sedimentation and flocculation of suspended solids in the raw water;

filtering reaction products formed during flocculation and retaining the resultant filtered water; and adding carbon dioxide and high-purity lime water to said filtered water to increase carbonate hardness, wherein said high-purity lime water is prepared by addition of calcium hydroxide and a polyelectrolyte to a portion of said raw water to form a water suspension mixture, flocculating sedimentable materials in said mixture, and separating sedimentable materials from a resultant high-purity lime water.

2. The method according to claim 1 further comprising adding high-purity lime water to adjust optimum pH for flocculation.

3. The method according to claim 1 wherein said high-purity lime water is added in an amount proportional to said raw water.

* * * * *